May 22, 1956   A. A. BUDNICK   2,746,161
SETTING GAUGE FOR TOOTHED WHEELS
Filed July 18, 1952
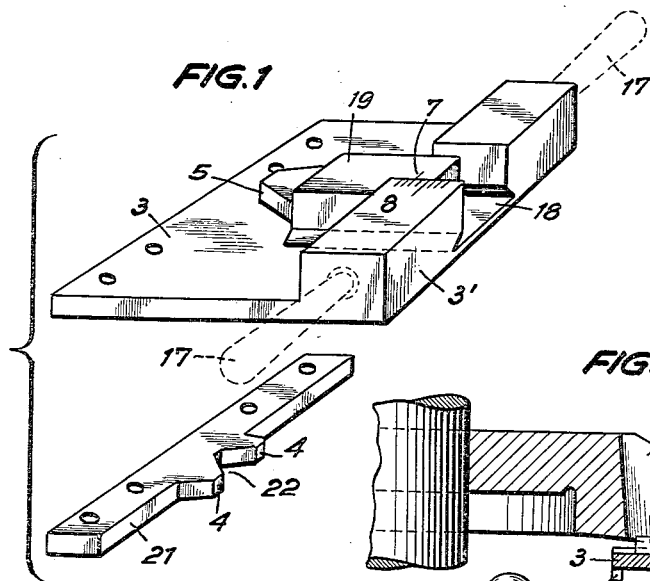
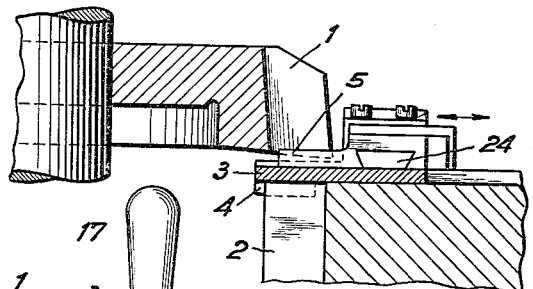
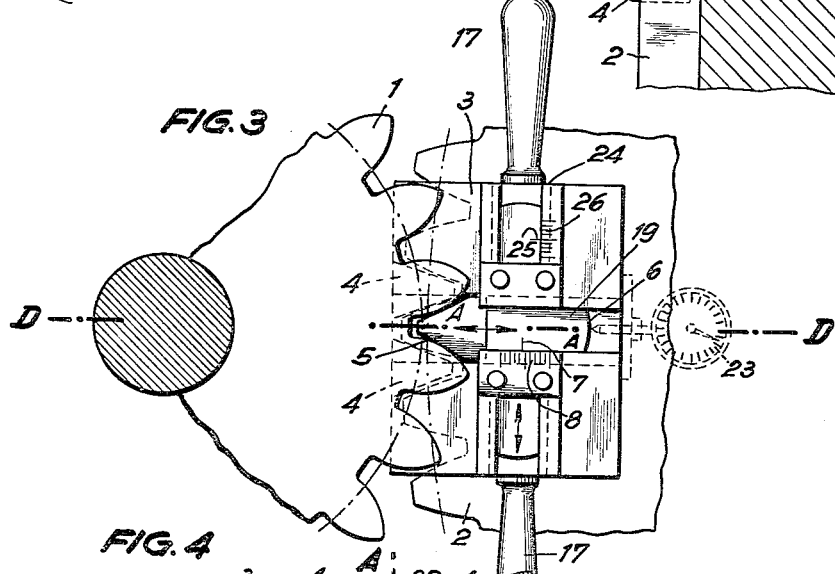
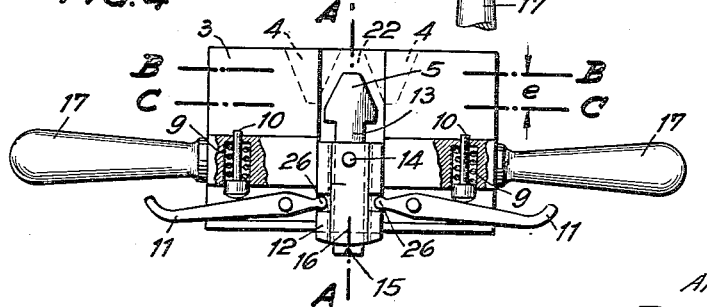
INVENTOR
Arno August Budnick
By
Patent Agent

United States Patent Office 2,746,161
Patented May 22, 1956

2,746,161

SETTING GAUGE FOR TOOTHED WHEELS

Arno August Budnick, Dusseldorf, Germany, assignor to Schiess A. G., Dusseldorf-Oberkassel, Germany Application July 18, 1952, Serial No. 299,694

10 Claims. (Cl. 33—185)

The present invention relates to a method of and device for placing a workpiece provided with teeth, especially a gear wheel, relative to a second member provided with teeth, especially a gear cutting tool, for further machining operations.

In order to subject the teeth of the gear wheel to a subsequent machining operation for purposes of reducing the thickness of the teeth or for establishing uniformity of the flanks of the teeth, it is necessary to place the gear wheel relative to the gear-cutting tool so as to assure an accurate mesh therebetween. In many instances, it is not possible to achieve such placing or adjustment by direct engagement of the gear wheel with the tool.

It is, therefore, an object of the present invention to provide an arrangement for and method of accurately and reliably placing two toothed members relative to each other for further machining operations.

With this and further objects in view, according to the present invention, a gauge having first and second tooth means is provided, the first tooth means of which is brought into mesh with the gear wheel or the like to be machined further, while said second tooth means is brought into mesh with the gear-cutting tool or the like. The positions of said first and second tooth means are then compared with each other, for instance, by a measuring scale. Since the dimensions of the tooth means on said gauge are known and the positions of the tooth means of the gear-cutting tool and of the gear wheel are defined by the gauge, the problem of placing a gear and a gear cutter relative to each other is reduced to the problem of setting two tooth means of a gauge in proper relation to each other.

This problem can be solved in a very simple way if gear racks are used as gauge tooth means and care is taken that the planes tangent to the crests of the gauge tooth means are always parallel to each other. To this end, according to the setting device of the present invention, the two gauge tooth means are connected to a carrier common to both.

Other and further objects, features and advantages of the invention will be pointed out hereinafter and appear in the appended claims forming part of the application. In the accompanying drawings two preferred embodiments of the invention are shown by way of example and not by way of limitation.

Fig. 1 is an isometric view of a gauge according to the invention, the elements of said gauge being shown in exploded view for sake of clarity.

Fig. 2 is a side view and fragmentary section of an arrangement showing the gauge in operation, one tooth means being in mesh with a gear-cutting tool and the other tool means meshing with a gear wheel.

Fig. 3 is a plan view of Fig. 2.

Fig. 4 is a plan view of a modified gauge according to the invention.

Similar reference numerals denote similar parts in the different views.

Referring now to the drawings in detail and Figs. 1 to 3 thereof in particular, it will be seen that the gauge comprises a plate 3 having its top and bottom surfaces parallel to each other. Projecting from plate 3 are parts 3' between which is slidably mounted, by means of a dovetail guide 18, a slide 19 from which projects a gauge tooth 5. The position of the slide 19 within the guide 18 is being indicated by the position of a mark 7 relative to a scale 8. Fastened to the bottom surface of plate 3 is a member 21, shown separately for the sake of clarity, which comprises two projecting teeth 4 defining between them a tooth space 22. The planes of symmetry of gauge tooth 5 and of the gauge tooth space 22 are arranged so as to coincide with each other. Two handles 17 may be provided for manipulating the device.

The operation of the gauge according to the invention, will now be described in connection with Figs. 2 and 3:

According to Fig. 2, the gear-cutting tool 1 is in an elevated position with regard to gear wheel 2 which is to be machined further. The plate 3 is now put on the gear wheel 2 in such a way that the teeth 4 engage therebetween one tooth of the gear wheel 2. Now the slide 19 is advanced by hand until gauge tooth 5 will engage the tooth space between two adjacent teeth of the cutting tool 1. Simultaneously, the position of the mark 7 relative to the scale 8 is read. This position is changed by rotation of the wheels 1 and 2. When the relative position of wheels 1 and 2 has been varied so that the tooth 5 can be advanced farthest into the adjacent tooth space of the gear-cutting tool 1, the setting of wheels 1 and 2 has been completed. Now the amount of subsequent machining can be set on the scale 8 by advancing the wheel toward the tool 1 accordingly.

As indicated in Fig. 3, it is also possible to provide in addition to or instead of the scale 8, a dial indicator 23 permitting a more accurate reading and measurement. Moreover, the gauge may be so designed that the studs 3' of the plate 3 form a carriage or slide which is longitudinally slidable in a dovetail guide 24 of plate 3, a mark 25 permitting to read on a scale 26 the position of the slide on the plate. The zero position, i. e. the position where the plane of symmetry of the gauge tooth 5 is in alignment with the plane of symmetry of the tooth space 22 may be especially marked. It will be understood that such longitudinal or rather tangential sliding of tooth 5 will further facilitate the setting of the gear wheel 2 with regard to the gear-cutting tool 1.

Referring now to the modification shown in Fig. 4, it will be seen that in this case springs 9 are provided which urge the tooth 5 through the intervention of spring-urged pins 10 and a pair of levers 11 to advance toward the cutting tool. The levers 11 may also be used for manually withdrawing the tooth 5, for instance, when the gauge tooth 5 during the adjustment of the gauge is to be inserted and adjusted between the teeth of the cutting tool. The levers 11 engage in recesses 26a on both sides of a slide 12 which is guided in the gauge parallel to the plane of symmetry of the teeth 4. Its guide strips and the cover plates of the gauge have been removed and the connecting means therefor are likewise not shown in the drawing. The shaft 13 of the tooth 5 has sufficient play in a groove-shaped recess in the bottom surface of slide 12 as to be able to swivel through a certain angle about the pivot 14 in the slide 12. The tooth 5 is in its correct position, when its mark 15 aligns with the mark 16. Moreover, the position of the mark 7 in relation to an associated scale (not shown) corresponding to the scale 8 of Fig. 3, has to be observed. Due to the pivotal mounting of tooth 5, it is ensured that its flanks will reliably engage the flanks of the gear cutting tool 1. The laterally arranged handles 17 permit easy handling of the gauge and easy reading of the scale.

It will be understood that the gauge shown in Fig. 4 could also be modified in such a way that the tooth 5 instead of being pivoted to the slide 12, would be tangentially, i. e. transversely, movable in the same, in the manner indicated in Fig. 3. In such an instance, the marks 15 and 16 also would have to indicate the central position of the tooth 5 in the slide 12. The direction of transverse sliding suitably would be perpendicular to that of the slide 12 in relation to plate 3, i. e., parallel to a plane tangent to the crests of the gauge teeth.

It will thus be understood that in order to adjust the workpiece for machining, the plane of symmetry A—A of the tooth or teeth of one gauge tooth means 5 must coincide with the plane of symmetry of the tooth space 22 of the other gauge tooth means 4. Moreover the distance $e$ between the planes B—B and C—C of the crests of the two gauge tooth means must be observed. It is necessary that not only the teeth of the gauge tooth means are properly aligned with regard to each other as to their planes A—A but also their crest planes B—B and C—C must form a right angle with the plane D—D passing through the two axes (of the workpiece and of the tool) and their center planes A—A must be parallel to the plane D—D to ensure that the teeth of the wheels 1 and 2 are not offset with regard to each other. The distance between the crest planes B—B and C—C is at a maximum when said planes are disposed at right angles to the plane D—D defined by the axes of the wheels. This law applies to all spur gears. In case of a helical gear wheel and a hobber, e. g., the crest planes of the two axes of the wheels 1 and 2 must be parallel and they have their maximum distance $e$ from each other in this case. Therefore, in the setting operation, one proceeds in such a way that the maximum distance $e$ between the planes B—B and C—C within the gauge teeth is found out by rotating the wheel 2 and the tool 1 and tilting the gauge tooth means 5. This value then determines the amount by which the wheel has to be machined. This amount will be zero if the planes tangent to the crests of the gauge tooth means coincide with each other and a meshing without play is required. It is not necessary that the gauge tooth means have the same pressure or obliquity or generating angle of tooth profile as the teeth of the tool 1 and of the gear wheel 2. They may differ in this respect provided that the thickness of these teeth or the width of their tooth space, and possibly their spiral angle, are dimensioned accordingly. Their relative position, at which the amount of post-machining is zero, may be defined by marks.

While the invention has been described in detail with respect to two now preferred examples and embodiments of the invention it will be understood by those skilled in the art after understanding the invention that various changes and modifications may be made without departing from the spirit and scope of the invention and it is intended, therefore, to cover all such changes and modifications in the appended claims.

I claim:

1. A gauge for setting a toothed workpiece relative to a gear-cutting tool having a plurality of teeth, which comprises: a carrier plate, first gauge tooth means mounted on one of the two major surfaces of said plate and adapted to be brought into meshing engagement with said workpiece, second gauge tooth means mounted on the other one of said two major surfaces of said plate, the crests of said first and second gauge tooth means being directed toward each other, said second gauge tooth means being arranged to enter a tooth space of said cutting tool and also being movable to bring its plane of symmetry into alignment with the plane of symmetry of said first gauge tooth means, and means indicating the deviation of the plane of symmetry of said second gauge tooth means relative to the plane of symmetry of said first gauge tooth means.

2. A device for setting a cutting tool relative to a toothed work piece for correcting the teeth of the latter, which comprises in combination: a plate having parallel top and bottom surfaces; first tooth means movably arranged on said top surface; second tooth means fixedly arranged on said bottom surface; said first tooth means being arranged to mesh with said cutting tool, and said second tooth means being arranged to mesh with the teeth of said work piece, said first and said second tooth means being arranged so as to have their crests directed toward each other; and means associated with the first tooth means and arranged to enable said first tooth means to move into a position in which its plane of symmetry coincides with that of said secnd tooth means and also to move said first tooth means relative to said cutting tool in radial direction of the latter to thereby make it possible to ascertain the deepest point of penetration of said first tooth means between the teeth of said cutting tool.

3. A gauge for placing a toothed workpiece, the teeth of which are to be machined further, relative to a cutting tool, which includes: a carrier, a first gauge tooth means fixedly connected to one side of said carrier and arranged for meshing engagement with the workpiece the teeth of which have to be machined further, a second gauge tooth means movably mounted on the opposite side of said carrier for meshing engagement with the cutting tool while being vertically spaced from said first gauge tooth means, said second gauge tooth means being movable into position so as to have a common plane of symmetry with said first gauge tooth means, the crest of the movable gauge tooth means being spaceable inwardly relative to the crest of said fixed tooth means by a distance approaching its maximum as the crest of said movable gauge tooth means approaches the root of said fixed gauge tooth means.

4. A gauge for placing a toothed workpiece, the teeth of which are to be machined further, relative to a cutting tool, which includes: a carrier plate, a first gauge tooth means fixedly connected to one side of said carrier plate and arranged for meshing engagement with the workpiece the teeth of which have to be machined further, a second gauge tooth means mounted on the opposite side of said carrier plate for meshing engagement with the cutting tool while being vertically spaced from said first gauge tooth means, said second gauge tooth means being movable into a position in which it has a common plane of symmetry with said first gauge tooth means, the crests of said first and second gauge tooth means being directed toward each other, and means for adjusting the crest of said second gauge tooth means relative to said first gauge tooth means.

5. A gauge for placing a toothed workpiece, the teeth of which are to be machined further, relative to a cutting tool, which includes: a carrier plate with parallel top and bottom surfaces, first gauge tooth means fixedly connected to the bottom side of said carrier plate and adapted to be brought into meshing engagement with said workpiece, second gauge tooth means movably mounted on the top surface of said carrier plate and movable relative to said first gauge tooth means for meshing engagement with said cutting tool, the crests of said first and second gauge tooth means being directed toward each other, said second gauge tooth means also being movable so as to bring its plane of symmetry into alignment with the plane of symmetry of said first gauge tooth means, and means for indicating the respective distance between the crests of said first and said second gauge tooth means.

6. A gauge for placing a toothed workpiece, the teeth of which are to be machined further, relative to a cutting tool, which includes: a carrier plate, first gauge tooth means fixedly connected to the bottom of said carrier plate and adapted to be brought into meshing engagement with the workpiece the teeth of which have to be machined further, a second gauge tooth means movably mounted on the top side of said carrier plate, said second gauge tooth means being movable into meshing engagement with said cutting tool and also being movable relative to said first gauge tooth means so as to have a common plane of symmetry with said first gauge tooth means, the crests of said first and second gauge tooth means being directed toward each other, and means for varying the distance of the crest of said second gauge tooth means relative to the crest of said first gauge tooth means.

7. A gauge for placing a toothed workpiece the teeth of which are to be machined further relative to a cutting tool, which includes: a carrier plate, first gauge tooth means fixedly connected to the bottom side of said carrier plate and adapted to be brought into meshing engagement with the workpiece the teeth of which have to be machined further, a slide slidably mounted on the top surface of said carrier plate, and second gauge tooth means carried by said slide and adapted to be brought into meshing engagement with said cutting tool, said second gauge tooth means being pivotally connected to said slide to allow pivoting said second gauge tooth means into a position in which its plane of symmetry coincides with the plane of symmetry of said first gauge tooth means, the crests of said first and second gauge tooth means being directed toward each other.

8. A gauge for placing a toothed workpiece, the teeth of which are to be machined further, relative to a cutting tool, which includes: a carrier plate, first gauge tooth means fixedly connected to the bottom side of said carrier plate and adapted to be brought into meshing engagement with the workpiece the teeth of which have to be cut further, first slide means slidably mounted on the top surface of said carrier plate, second gauge tooth means carried by said slide and adapted to be brought into meshing engagement with said cutting tool, said second gauge tooth means being pivotally connected to said slide to allow pivoting said second gauge tooth means into a position in which its plane of symmetry coincides with the plane of symmetry of said first gauge tooth means, the crests of said first and second gauge tooth means being directed toward each other, and second slide means mounted on the top surface of said carrier plate and arranged for moving said first slide means in a direction transverse to the movement of said first slide means.

9. A gauge for placing a toothed workpiece, the teeth of which are to be machined further, relative to a cutting tool having a plurality of teeth, which includes: a carrier plate, first gauge tooth means fixedly but detachably connected to the bottom side of said carrier plate and arranged for meshing engagement with the workpiece the teeth of which have to be machined further, second gauge tooth means arranged for meshing engagement with the cutting tool and movable relative thereto, said second gauge tooth means also being movable relative to said first gauge tooth means so as to have a common plane of symmetry with said first gauge tooth means, the crests of said first and second gauge tooth means being directed toward each other, and means for measuring the deepest penetration of said second gauge tooth means into a tooth space between two adjacent teeth of said cutting tool.

10. A gauge for placing a toothed workpiece, the teeth of which are to be machined further, relative to a cutting tool having a plurality of teeth, which includes: a carrier plate, first gauge tooth means designed as a rack and fixedly connected to the bottom side of said carrier plate, said first gauge tooth means being adapted to be brought into meshing engagement with the workpiece the teeth of which have to be machined further, second gauge tooth means arranged on the top side of said carrier plate, said second gauge tooth means being designed as a single tooth and being movable relative to said cutting tool for engaging a tooth space of the latter, said second gauge tooth means also being movable relative to said first gauge tooth means so as to bring its plane of symmetry into alignment with the plane of symmetry of said first gauge tooth means, the crests of said first and second gauge tooth means being directed toward each other, and means for measuring the penetration of said second gauge tooth means into the tooth space between two adjacent teeth of said cutting tool.

References Cited in the file of this patent

UNITED STATES PATENTS

| | | |
|---|---|---|
| 1,034,927 | Oehler | Aug. 6, 1912 |
| 2,379,406 | Alvis | July 3, 1945 |
| 2,468,395 | Fredin | Apr. 26, 1949 |
| 2,561,534 | Parker et al. | July 24, 1951 |
| 2,618,071 | Davis et al. | Nov. 18, 1952 |